United States Patent
Raab et al.

(10) Patent No.: US 7,784,194 B2
(45) Date of Patent: Aug. 31, 2010

(54) PORTABLE COORDINATE MEASUREMENT MACHINE

(75) Inventors: Simon Raab, Santa Barbara, CA (US); Clark H. Briggs, DeLand, FL (US); Marc Barber, Deltona, FL (US); David Danielson, Sorrento, FL (US); Kenneth Steffey, Sanford, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 78 days.

(21) Appl. No.: 11/947,406

(22) Filed: Nov. 29, 2007

(65) Prior Publication Data

US 2008/0148585 A1 Jun. 26, 2008

Related U.S. Application Data

(60) Provisional application No. 60/861,884, filed on Nov. 30, 2006.

(51) Int. Cl.
*G01B 5/008* (2006.01)
*G01B 7/008* (2006.01)

(52) U.S. Cl. ........................................ 33/503
(58) Field of Classification Search .................. 33/503
See application file for complete search history.

(56) References Cited

U.S. PATENT DOCUMENTS

| | | | | |
|---|---|---|---|---|
| 3,069,778 | A | * | 12/1962 | Schiler .......................... 33/503 |
| 5,396,712 | A | * | 3/1995 | Herzog .......................... 33/503 |
| 5,402,582 | A | * | 4/1995 | Raab ............................. 33/503 |
| 5,621,978 | A | * | 4/1997 | Sarauer ......................... 33/503 |
| 5,890,300 | A | | 4/1999 | Brenner et al. |
| 6,131,299 | A | | 10/2000 | Raab et al. |
| 6,253,458 | B1 | * | 7/2001 | Raab et al. ..................... 33/503 |
| 6,354,012 | B1 | * | 3/2002 | Pettersson ..................... 33/503 |
| 6,397,485 | B1 | * | 6/2002 | McMurtry ..................... 33/503 |
| 6,668,466 | B1 | | 12/2003 | Bieg et al. |
| 6,892,465 | B2 | | 5/2005 | Raab |
| 6,904,691 | B2 | * | 6/2005 | Raab et al. ..................... 33/503 |
| 6,920,697 | B2 | | 7/2005 | Raab |
| 6,935,036 | B2 | | 8/2005 | Raab |
| 6,952,882 | B2 | | 10/2005 | Raab |

(Continued)

FOREIGN PATENT DOCUMENTS

DE 33 13 155 10/1984

(Continued)

OTHER PUBLICATIONS

International Search Report with Written Opinion, PCT/US2007/024599, Date mailed Oct. 14, 2008, search report having 9 pages, written opinion having 12.

*Primary Examiner*—Christopher W Fulton
(74) *Attorney, Agent, or Firm*—Cantor Colburn LLP (57) ABSTRACT

A portable coordinate measurement machine (CMM) is disclosed. The CMM may include a manually positionable articulated arm having opposed first and second ends and a measurement probe attached to the first end articulated arm. The arm may include a plurality of jointed arm segments. Each arm segment may include at least one position transducer for producing a position signal. The CMM may also include an electronic circuit that receives the position signals from the transducers and provides a digital coordinate corresponding to the position of the probe in a selected volume. At least one of the arm segments may be non-linear along its length.

20 Claims, 11 Drawing Sheets

U.S. PATENT DOCUMENTS

| | | |
|---|---|---|
| 6,957,496 B2 | 10/2005 | Raab |
| 6,965,843 B2 | 11/2005 | Raab |
| 6,973,734 B2 | 12/2005 | Raab |
| 6,988,322 B2 | 1/2006 | Raab |
| 6,996,912 B2 | 2/2006 | Raab |
| 7,017,275 B2 | 3/2006 | Raab |
| 7,032,321 B2 | 4/2006 | Raab |
| 7,043,847 B2 | 5/2006 | Raab |
| 7,051,450 B2 | 5/2006 | Raab |
| 7,073,271 B2 | 7/2006 | Raab |
| 7,174,651 B2 | 2/2007 | Raab |
| 7,246,030 B2 | 7/2007 | Raab |
| 7,269,910 B2 | 9/2007 | Raab |
| 7,508,971 B2 * | 3/2009 | Vaccaro et al. ............... 382/141 |
| 7,519,493 B2 | 4/2009 | Atwell |
| 2004/0187332 A1 * | 9/2004 | Kikuchi et al. ................ 33/503 |
| 2009/0013547 A1 * | 1/2009 | Ferrari et al. ................. 33/503 |
| 2009/0013549 A1 * | 1/2009 | Lutz ............................ 33/503 |
| 2009/0049704 A1 * | 2/2009 | Styles et al. .................. 33/503 |
| 2009/0187373 A1 | 7/2009 | Atwell et al. |

FOREIGN PATENT DOCUMENTS

| | | |
|---|---|---|
| GB | 1 498 009 | 1/1978 |
| WO | 99/27320 | 6/1999 |
| WO | 03/069266 | 8/2003 |
| WO | 03/069267 | 8/2003 |
| WO | 03/069277 | 8/2003 |
| WO | 2007/097841 | 8/2007 |

* cited by examiner

PORTABLE COORDINATE MEASUREMENT MACHINE

CROSS REFERENCE TO RELATED APPLICATIONS

This application claims priority to U.S. Provisional Application No. 60/861,884 filed Nov. 30, 2006, the entire contents of which are incorporated herein by reference.

FIELD OF THE INVENTION

The invention relates in general to coordinate measurement machines (CMMs) and in particular to portable CMMs having an articulated arm.

BACKGROUND OF THE INVENTION

Currently, portable articulated arms are provided as a measurement system with a host computer and applications software. The articulated arm is commonly used to measure points on an object and these measured points are compared to computer aided design (CAD) data stored on the host computer to determine if the object is within the CAD specification. In other words, the CAD data is the reference data to which actual measurements made by the articulated arm are compared. The host computer may also contain applications software that guides the operator through the inspection process. For many situations involving complicated applications, this arrangement is appropriate since the user will observe the three-dimensional CAD data on the host computer while responding to complex commands in the applications software.

An example of a prior art portable CMM for use in the above-discussed measurement system is disclosed in U.S. Pat. No. 5,402,582 ('582), which is assigned to the assignee hereof and incorporated herein by reference. The '582 patent discloses a conventional three-dimensional measuring system composed of a manually operated multi-jointed articulated arm having a support base on one end thereof and a measurement probe at the other end. A host computer communicates with the arm via an intermediate controller or serial box. It will be appreciated that in the '582 patent, the arm will electronically communicate with the serial box which, in turn, electronically communicates with the host computer. Commonly assigned U.S. Pat. No. 5,611,147 ('147), which is again incorporated herein by reference, discloses a similar CMM having an articulated arm. In this patent, the articulated arm includes a number of important features including an additional rotational axis at the probe end thus providing for an arm with either a two-one-three or a two-two-three joint configuration (the latter case being a 7 axis arm) as well as improved pre-loaded bearing constructions for the bearings in the arm.

More current portable CMMs of the type described herein do not necessitate the use of an intermediate controller or serial box since the functionality thereof is now incorporated in the software provided by the host computer. For example, commonly assigned U.S. Pat. No. 5,978,748 ('748), which is incorporated herein by reference, discloses an articulated arm having an on-board controller which stores one or more executable programs and which provides the user with instructions (e.g., inspection procedures) and stores the CAD-data that serves as the reference data. In the '748 patent, a controller is mounted to the arm and runs the executable program which directs the user through a process such as an inspection procedure. U.S. Pat. No. 6,612,044 assigned to the assignee hereof and incorporated herein by reference, discloses a method and system for delivering executable programs to users of coordinate measurement systems of the type disclosed in the '748 patent.

Commonly assigned U.S. Pat. No. 6,131,299 ('299), (all the contents of which is incorporated herein by reference), discloses an articulated arm having a display device positioned thereon to allow an operator to have a convenient display of positional data and system menu prompts. U.S. Pat. No. 6,219,928 ('928), which is assigned to the assignee and incorporated herein by reference, discloses a serial network for the articulated arm. The serial network communicates data from transducers located in the arm to a controller. Each transducer includes a transducer interface having a memory which stores transducer data. The controller serially addresses each memory and the data is transferred from the transducer interface memory to the controller.

U.S. Pat. No. 6,957,496, assigned to the assignee hereof and incorporated herein by reference, discloses a portable CMM which comprises an articulated arm having jointed arm segments. In one embodiment, the arm segments include bearing/encoder cartridges which are attached to each other at predetermined angles. Each cartridge contains at least one, and preferably two, preloaded bearing assemblies and an encoder, preferably an optical encoder, all assembled in a housing. Preferably, two or more encoder read heads are used in each joint so as to improve measurement accuracy.

U.S. Pat. No. 7,073,271, assigned to the assignee hereof and incorporated herein by reference, also discloses an articulated arm-type CMM having jointed arm segments. The jointed arm segments include a rotatable shaft, at least two spaced bearings and a housing surrounding the bearings and shaft wherein races for the bearings are formed by at least one of the following: (1) the shaft constitutes the inner race of at least one of the two bearings and (2)the housing constitutes the outer race of at least one of the two bearings.

U.S. Pat. No. 7,050,930, assigned to the assignee hereof and incorporated herein by reference, discloses an articulated arm-type CMM wherein the articulated arm includes a measurement probe having a laser scanner rotatably mounted thereon.

While well suited for their intended purposes, there is a continued and perceived need in the industry for improved portable CMMs that are easier to use, more efficient to manufacture, provide improved features and can be sold at a lower cost.

SUMMARY OF THE INVENTION

In accordance with this invention, a portable CMM comprises an articulated arm having jointed arm segments. In one embodiment, the arm segments are non-linear in the longitudinal direction. Preferably, the arm segments are curved or arcuate. This is in distinct contrast to prior art arm segments which are generally linear and more particularly, tubular with respect to the longitudinal direction of the arm segment.

In another embodiment, the arm segments have a cross-section which is non-circular with the cross-section having a shape, for example, of an I-beam, an ellipse, a square, a triangle, an aspheric shape, a cross or other non-circular cross-section. An arm segment having an non-circular cross-section is in distinct contrast to prior art segments which have a tubular or cylindrical longitudinal shape and therefore typically have a circular cross-section.

The use of a non-tubular arm segment allows the arm segments to be manufactured from an appropriate molding material such as a carbon fiber reinforced molding material thus leading to arm segments which are much lighter in weight and therefore can lead to improved measurement accuracies. The use of an arc shape in the arm segment will enhance the strength when such arm segments are made from a molding material relative to linear tubular shaped arms. The non-tubular shaped arm segments also allow for printed circuit boards and other electronics to be easily removed from and inserted within the arm segments thereby allowing for improved servicing and disassembling of the product for both manufacture and repair. This also alleviates if not eliminates the recalibration of the CMM during routine service or repair.

In yet another embodiment, the arm segments include integral molded elbows. The ability to mold an arm segment together with at least one elbow is in contrast to prior art described above wherein a separate clevis was attached to an arm segment and therefore required connection means to be employed.

In another embodiment, the articulated arm is equipped with an integrated arm restraint mechanism which includes a visual indication of whether the arm restraint has been activated or deactivated.

In another embodiment, the articulated arm terminates at a measurement probe which includes an integrated track ball for use in the field and for object selection required by the software. The track ball is integrated into the handle of the measurement probe and permits the user to manipulate the measurement software without physically returning to the computer where it is installed. Preferably, the track ball also serves as an LED indicator light. Thus, when rolled, the track ball simulates mouse operation.

The above-discussed and other features and advantages of the present invention will be appreciated and understood by those skilled in the art from the following detailed description and drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENTS

Referring first to FIGS. 1-4, a portable CMM is shown at 10 and comprises a base 12, a first arm 14 articulated to base 12, a second arm 16 articulated to arm 14, and a measurement probe 18 articulated to arm 16. CMM 10 has six degrees of freedom in a so-called 2-2-2 joint configuration such that there are two joints between arm 14 and base 12, two joints between arms 14 and 16 and two joints between arm 16 and measurement probe 18. Each of the three joint pairs includes both a swivel and hinged joint pair. It will be appreciated that the 2-2-2 configuration shown in FIGS. 1-4 is but one embodiment of the CMM and that any other suitable number of joint and/or joint pair configurations are encompassed by the present invention. Other examples include CMMs having less than six degrees of freedom or more than six degrees of freedom (for example, a seven degree of freedom arm) and joint pair configurations such as a 2-1-2, 1-2-3, or 2-2-3 configurations to name a few. In a preferred embodiment, each joint includes a bearing/encoder cartridge of the type disclosed in aforementioned U.S. Pat. No. 6,957,496.

As shown in FIGS. 1-4, the two jointed arm sections 14 and 16 have a non-linear shape in the longitudinal direction. In the embodiment disclosed, the arms are curved or arcuate. The curved or arcuate shape of the arm is helpful in positioning the arm in enclosed spaces. More specifically, arm 14 is shown more clearly in FIG. 5 while arm 16 is shown more clearly in FIG. 6.

Figure 1:
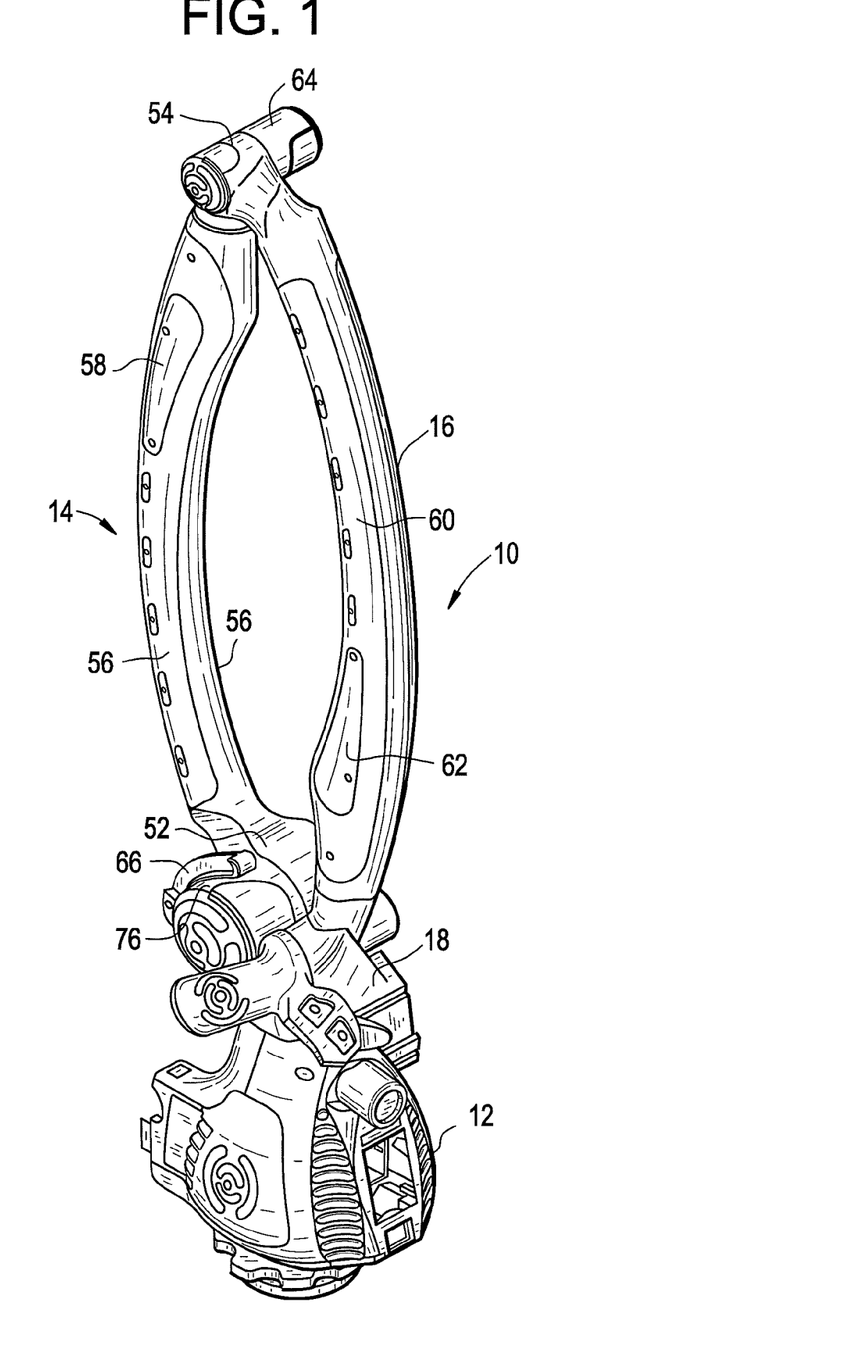
FIG. 1 is a front perspective view of the portable CMM of the present invention.
Figure 2:
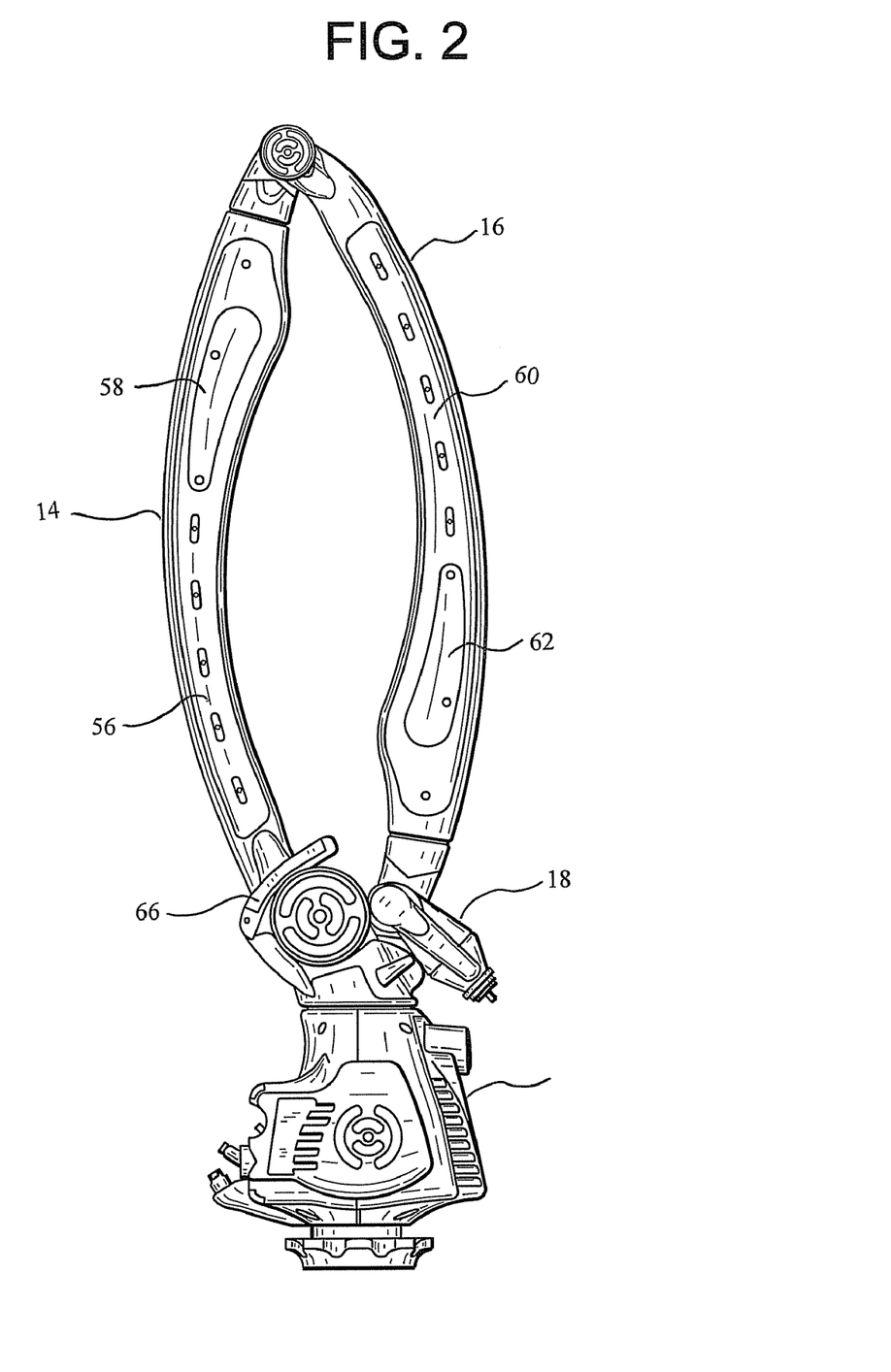
FIG. 2 is a right side elevation view of the CMM of FIG. 1.
Figure 3:
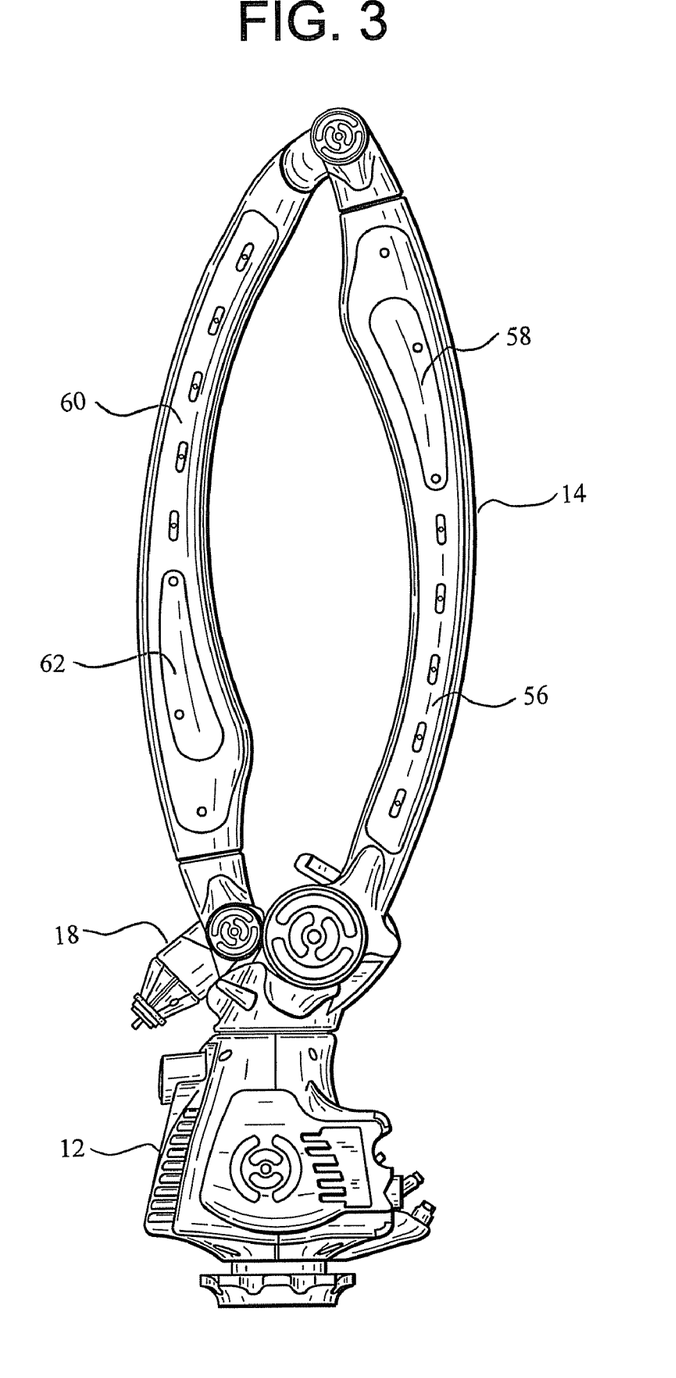
FIG. 3 is a left side elevation view of the CMM of FIG. 1.
Figure 4:
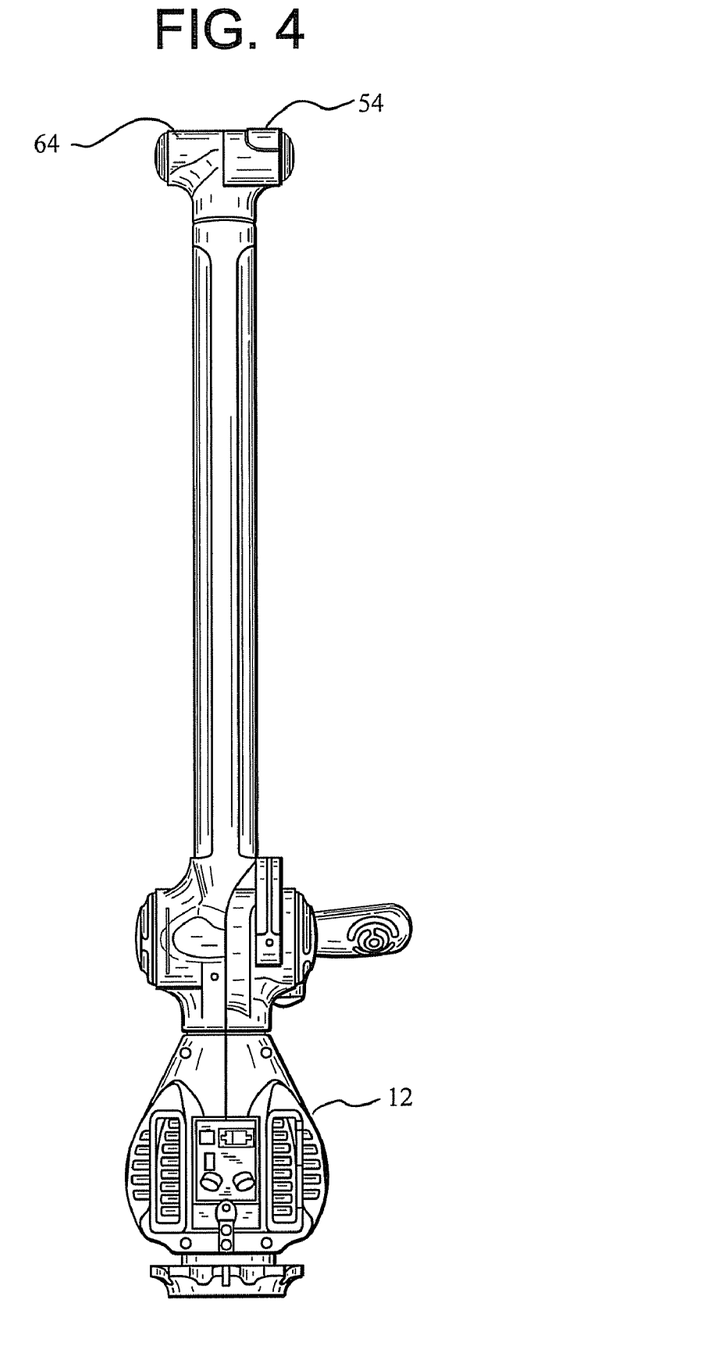
FIG. 4 is a rear elevation view of the CMM of FIG. 1.
Figure 5:
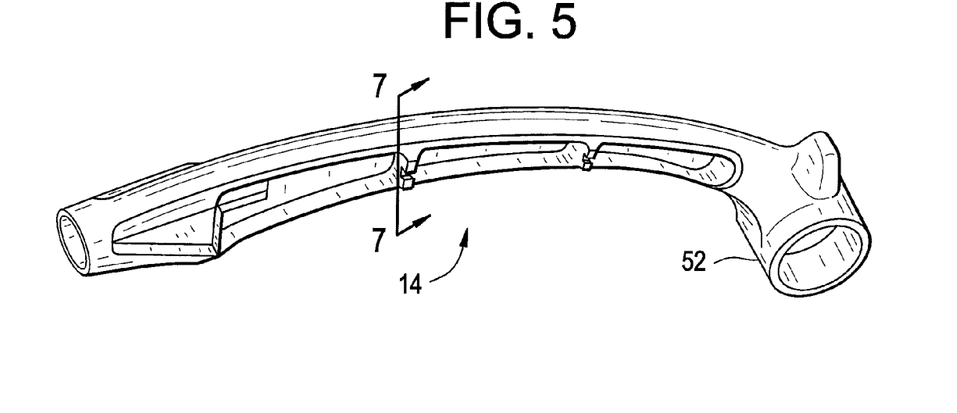
FIG. 5 is a perspective view of an arm segment used in the CMM of FIG. 1.
Figure 6:
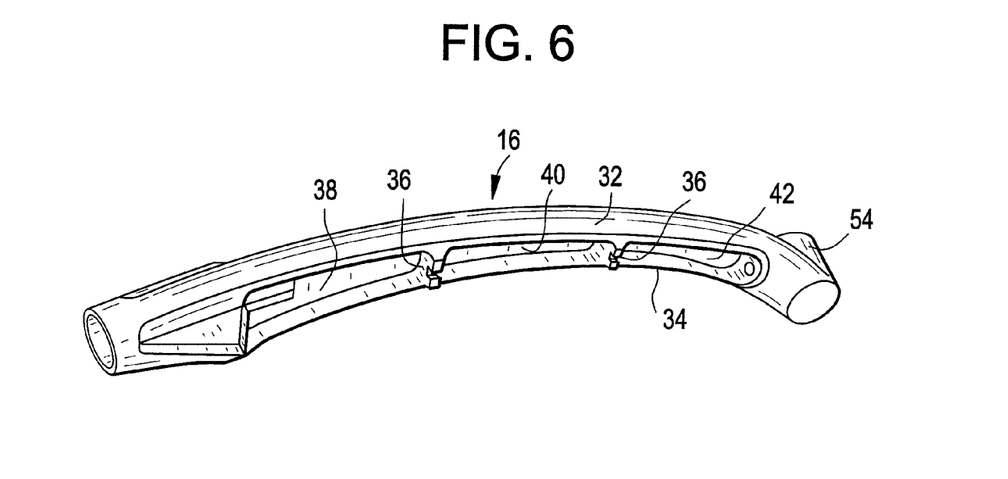
FIG. 6 is a perspective view of another arm segment used in the CMM of FIG. 1.
Figure 9:
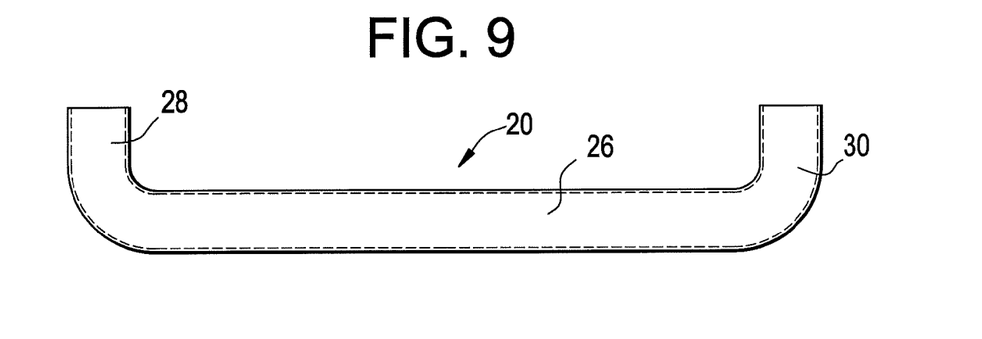
FIGS. 9-11 are top plan views of arm segments having various shapes.
Figure 10:
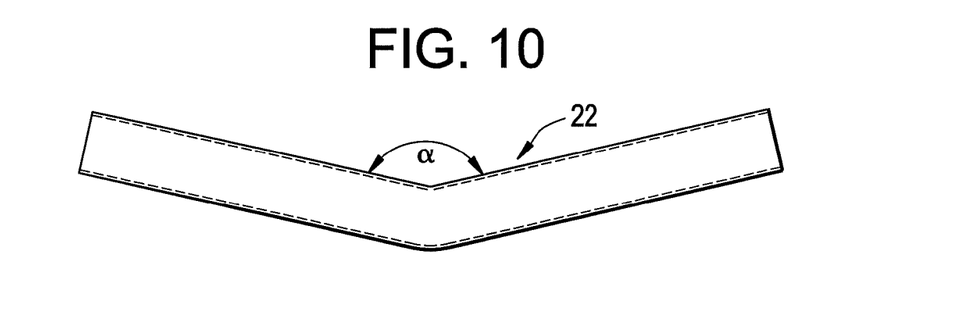
Figure 11:
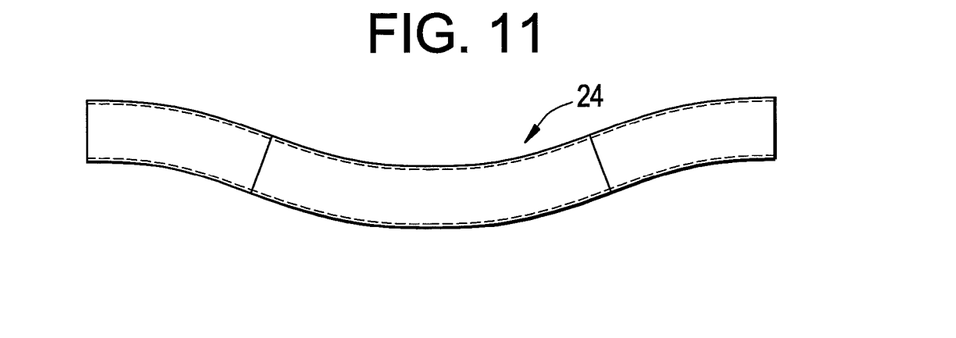

While the arms 14, 16 of FIGS. 5 and 6 are shown having a curved or arcuate longitudinal shape, it will be appreciated that any other non-linear and/or non-tubular longitudinal shape may also be employed and encompassed by this invention. For example, as shown in FIGS. 9, 10 and 11, alternative embodiments 20, 22 and 24, respectively, are shown. Arm 20 of FIG. 9 has a longitudinal section 26 with a pair of integrally curved elbow sections 28 and 30. Arm 22 of FIG. 10 has two linear sections which are integrally formed or attached at an angle alpha. It will be appreciated that angle alpha could take on desired angle. Additionally, arm 24 of FIG. 11 has a set of reverse curves formed therein. In any event, it will be appreciated that any non-linear shape for the arm segments may be utilized by the present invention. It is noted that the curved, arcuate, or non-linear shape can facilitate measurements in small or confined spaces, for example, inside of a turbine or other enclosed spaces.

Figure 19:
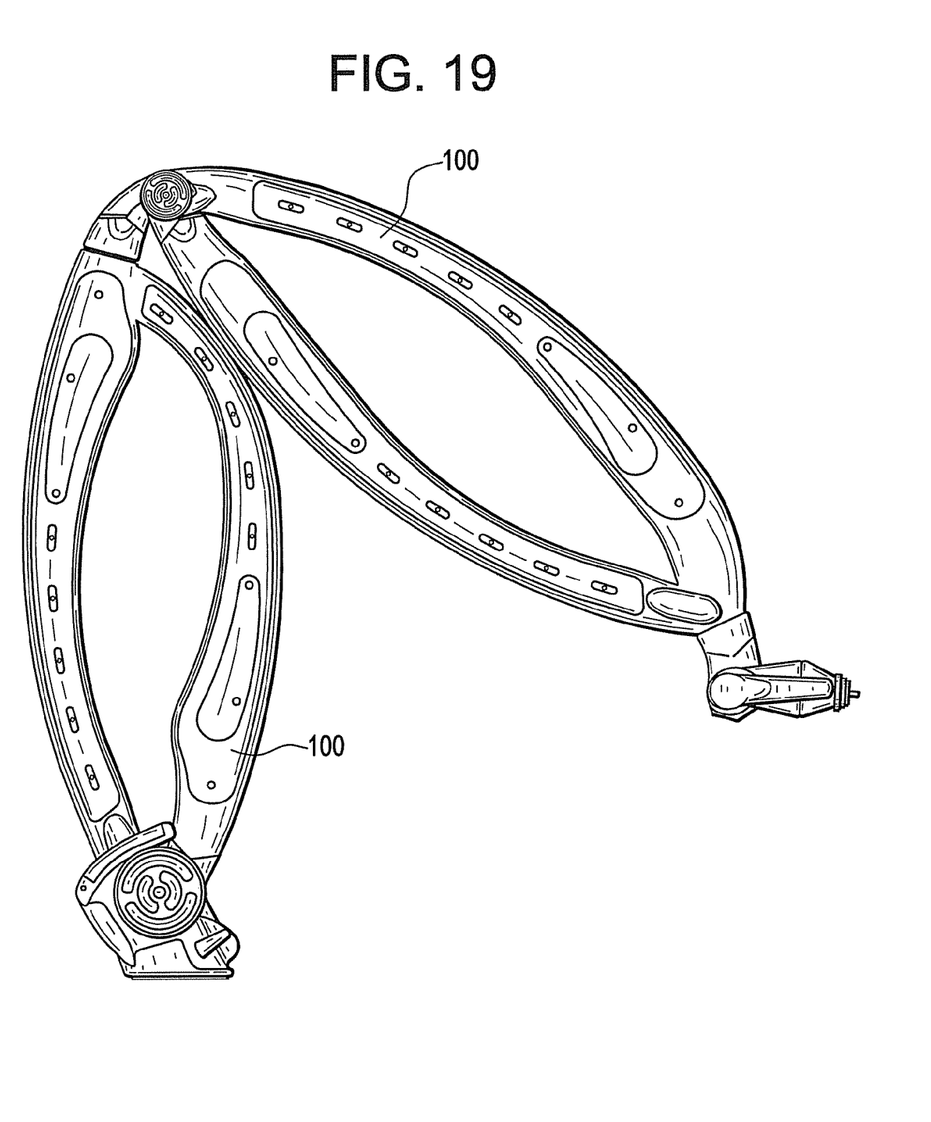
FIG. 19 is a side view of at least an embodiment of a CMM.

Additionally, FIG. 19 illustrates another possible embodiment of the arm shape. As seen in FIG. 19, at least one of the arms may be formed as an approximately oval shaped arm 100. The oval shape of the arm helps to provide even more structural support of the arm when it is extended. It is also noted that any of the cross-sectional structures noted above can also be used for the oval shaped arm 100.

Figure 7:
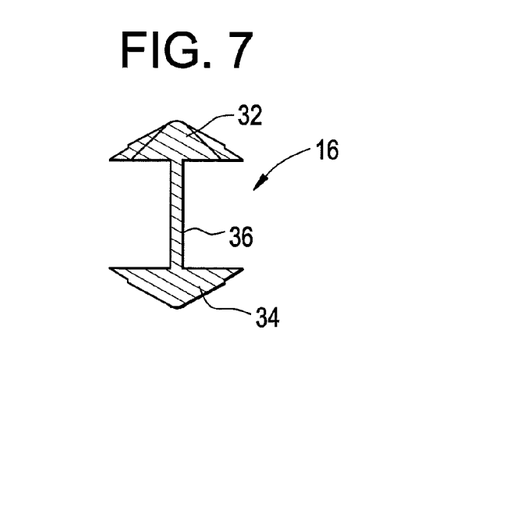
FIG. 7 is cross-sectional view along the line 7-7 of FIG. 5.

As best shown in FIG. 7, another feature of the embodiment disclosed is that the transverse cross-section of each arm segment is non-circular. Thus, for example, as shown in FIGS. 5 an 6 and more particularly shown in FIG. 7, the cross-section of the arm segment has an I-beam configuration and includes an upper longitudinal portion 32, a lower longitudinal portion 34 and a rib section 36. In the embodiment shown, the arm section 16 has two rib sections 36 thus defining three openings 38, 40 and 42.

Figure 8:
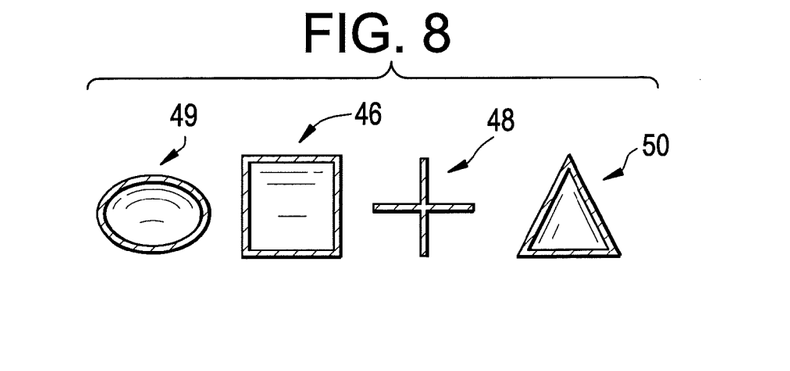
FIG. 8 are cross-sectional views of alternative embodiments of arm segments used in the arm of FIG. 1.

While arms 14 and 16 have an I-beam like cross-section, it will be appreciated that any other geometric cross-sectional shape (based on spherical or aspherical geometry) may also be employed with the arm sections. For example, with reference to FIG. 8, four other embodiments of non-circular cross sections are shown including an oval or elliptical cross-section 44, a square cross-section 46, a cross-section in the form of a cross 48 and a triangular cross-section 50.

Significantly, the non-tubular arm sections are quite distinct from the arm sections used in the prior art including the prior art patents referenced in the background section above. In the prior art, such arms sections were typically tubular and would typically have a circular cross-section and be linear in the longitudinal direction. In accordance with this invention, however, the arm sections are non-tubular with respect to the longitudinal direction of the arm section and moreover, the cross-section is non-circular. The ability of the arm section to have a non-linear or non-tubular longitudinal length and more particularly the use of an arc or curved shape arm section leads to enhanced strength of the arm section by providing more material over a given length relative to a straight or linear tubular arm segment.

Thus, rigidity of the CMM is improved or at least maintained in comparison to the traditional tubular arm segments while providing access and repairability capabilities. Also, with increases in CMM accuracy, rigidity requirements are also increasing and are very important to proper functioning of the CMM In a preferred embodiment, the arm segments are made from a moldable composite material, preferably a moldable carbon composite material and more preferably a moldable carbon composite having a low coefficient of thermal expansion. In one embodiment, the moldable composite is a carbon fiber filled epoxy resin. Again, the use of a moldable composite material for manufacturing the arm segments is in distinct contrast to the prior art wherein the typically tubular arm segments would be made from machined or cast metal or would be made from a tube manufactured by a resin impregnated carbon fiber wound on a mandrel. In fact, the use of a moldable composite more readily allows the arm segments to take on any longitudinal and cross-sectional shape having the desired properties since such arm segments can be machined into a mold with the arm segments then being manufactured by conventional molding processes. Furthermore, it is noted that the arm segments may be made by pressure molding as opposed to injection molding. Pressure molding can eliminate the need for release valves that are required in injection molding.

Figure 12:
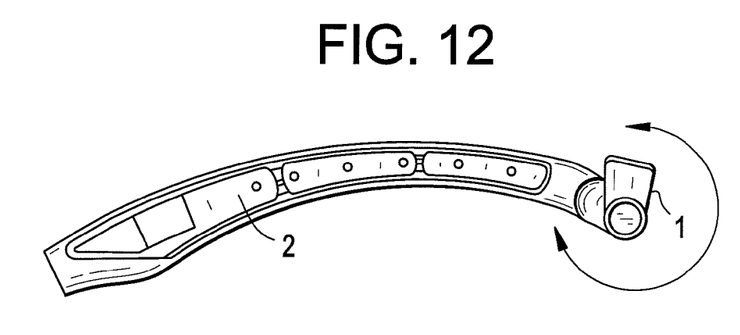
FIG. 12 is a side elevation view of an arm segment depicting an integrated elbow.
Figure 13:
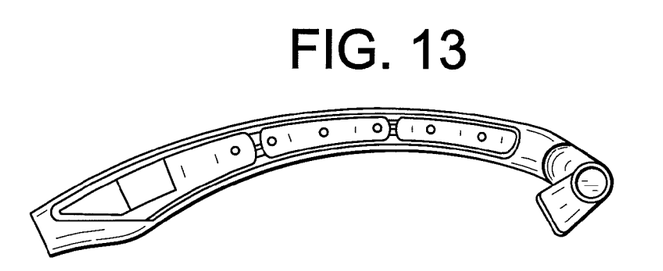
FIG. 13 is side elevation view of another arm segment depicting an integrated elbow.
Figure 14:
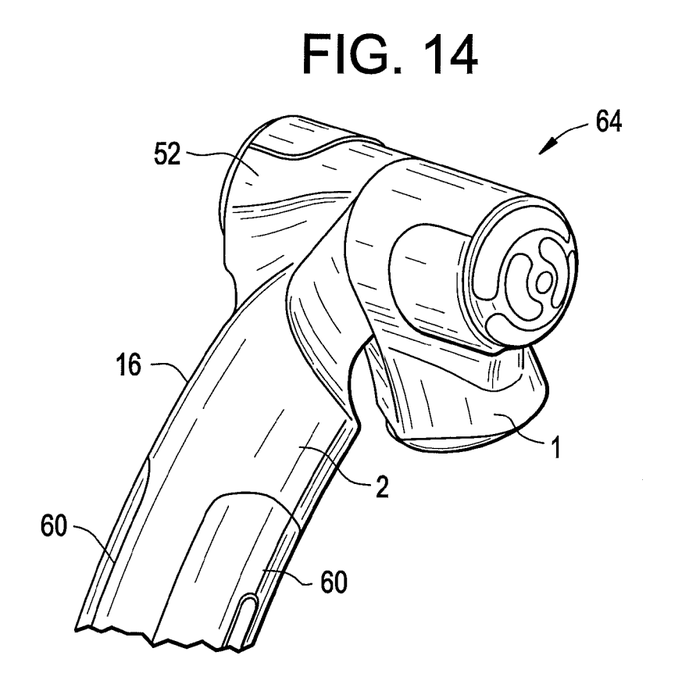
FIG. 14 is a perspective view of a portion of the arm segment and integrated elbow used in the CMM of FIG. 1.

Still referring to FIGS. 5 and 6 and with reference to FIGS. 12-14, each arm segment 14, 16 includes an elbow 52, 54, respectively which is integrated onto one end of the arm segment. The use of an integrated elbow segment eliminates what in the prior art would have been a separate elbow segment and the need for an associated fastening system or union to connect the elbow segment to the arm segment. The fastening system or unions in the prior art add metal components with a higher coefficient of thermal expansion than a single carbon fiber component. Accordingly, using an integrated elbow formed from the aforementioned composite molding material and particularly a carbon fiber molded material acts to reduce thermal effects on the final CMM arm. This is because typical prior art construction using fasteners and other union means add metal components with a higher coefficient of thermal expansion than does a single carbon fiber component.

It will further be appreciated that the non-tubular arm segments of FIGS. 5 and 6 allow PC boards and other electronics to be easily located within the openings 38, 40 or 42 and then be easily removed for servicing without disassembling the whole CMM product. This ability also eliminates recalibration of the CMM product during routine service or repair. This is an enormous benefit and results in significant time savings.

For example, in certain applications, it is critical to complete a measurement in a certain amount of time. In the case of a large object to be measured, such as an airplane wing in a hangar, the dimensions of the wing may change as a function of temperature as the day progresses from morning to afternoon. Therefore, it is important to measure the wing as quickly as possible to minimize possible time-based fluctuations. If recalibration of the CMM is required during the measurement process, this can waste valuable time. Therefore, it would be very valuable to use a CMM that would not require recalibration during a measuring process.

As shown in FIGS. 1-4, covers are provided over the openings 38, 40 and 42 to protect the PC boards and associated electronics. The covers may be made out of rubber, for example, or other suitable material. More specifically, arm 14 includes a pair of relatively longer covers 56 on opposite sides of the arm segment as well as a pair of smaller covers 58. Similarly, arm segment 16 includes a pair of oppositely disclosed long cover sections 60 together with a pair of smaller covers 62. These covers can be easily removed so that any part of the arm segments can be easily accessed and serviced. Additionally, this configuration allows for the easy replacement or upgrade of parts.

In contrast, in conventional devices with tubular arms, there are no openings in the arm. Thus, the internal components of a conventional arm cannot be easily accessed. Repair or parts replacement in a conventional tubular arm typically requires disassembling the entire structure, rather than simply removing a cover.

In the prior art, for example, many CMM's are not repairable at all. This is because there is no access provided to the internal parts and also because the internal parts are typically epoxied and permanently fixed to the CMM. Therefore, the prior art, the internal components are not removable or repairable at all.

In FIGS. 12-14, arm segment 16 is shown with its elbow 52 having attached thereto a separate elbow component 64. It will be appreciated that elbow component 64 in turn is attached to arm segment 14 as shown in FIGS. 1-4. It will further be appreciated that positioned between elbows 52 and elbow element 64 is a modular bearing/encoder cartridge of the type described in the '496 patent. This cartridge could be adhesively or otherwise attached between elbows 52 and 64. Elbow element 64 will rotate with respect to elbow 52 to allow arm segments 14 and 16 to pivot with respect to each other. In one embodiment, elbow 64 (and therefore arm 14) will pivot up to about 270°. It will be appreciated that each of the joints in CMM 10 will includes appropriate encoders and bearing elements so as to permit two degrees of rotation at all of the ends of the arm segments. In a preferred embodiment, the encoder/bearing assemblies are again of the type described in the '496 patent such that two bearing encoder cartridges are positioned between the base and arm segment 14, two such cartridges are positioned between arm segments 14 and 16, and two such cartridges are positioned between arm 16 and measurement probe 18. Again, it will be appreciated that additional cartridges (or for that matter lesser numbers of cartridges) may be utilized with CMM 10. If desired, these cartridges can exhibit infinite rotation as described in the '496 patent.

Figure 15:
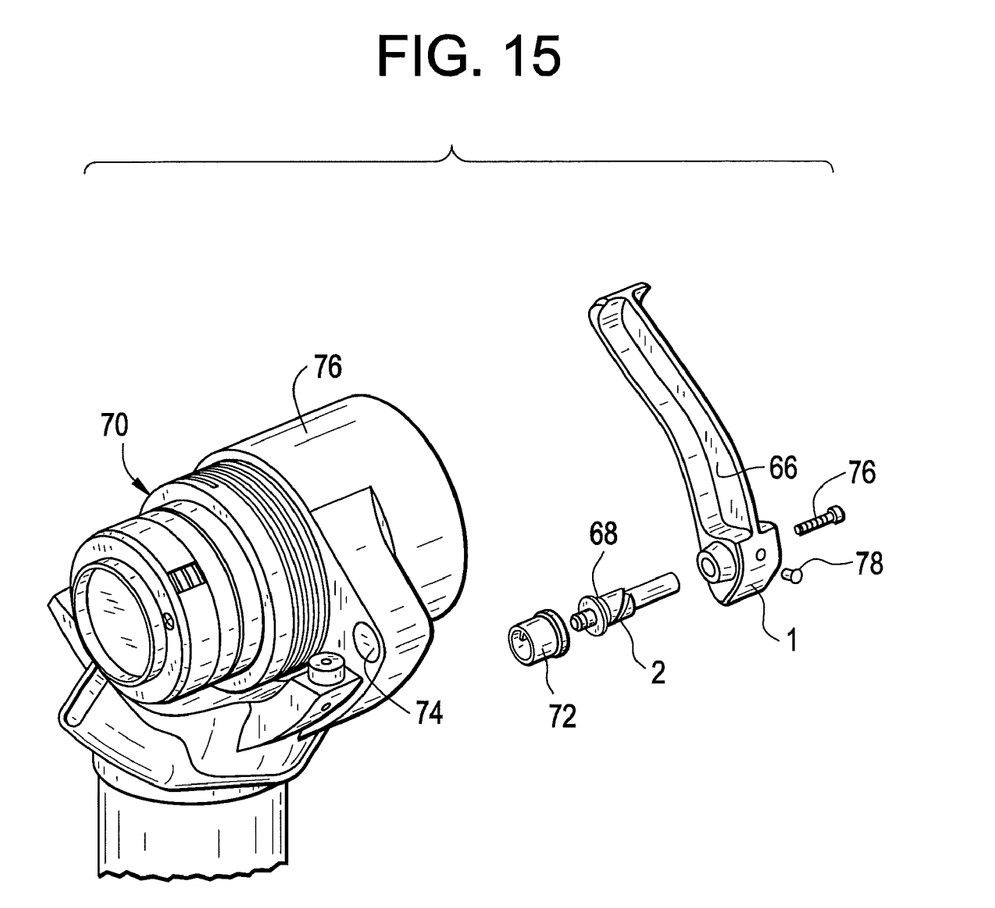
FIG. 15 is an exploded view of an arm restraint used in the CMM of FIG. 1.
Figure 16A:
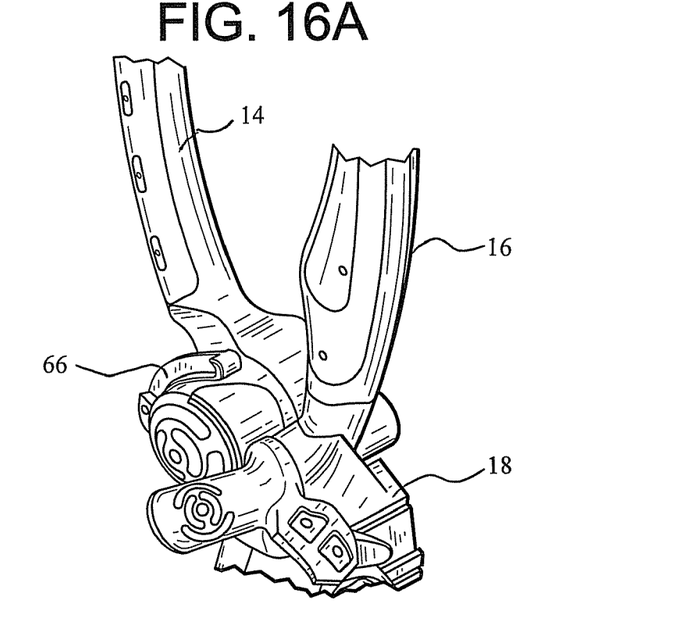
FIGS. 16A and 16B respective perspective views showing the arm restraint in a unlocked and locked position.
Figure 16B:
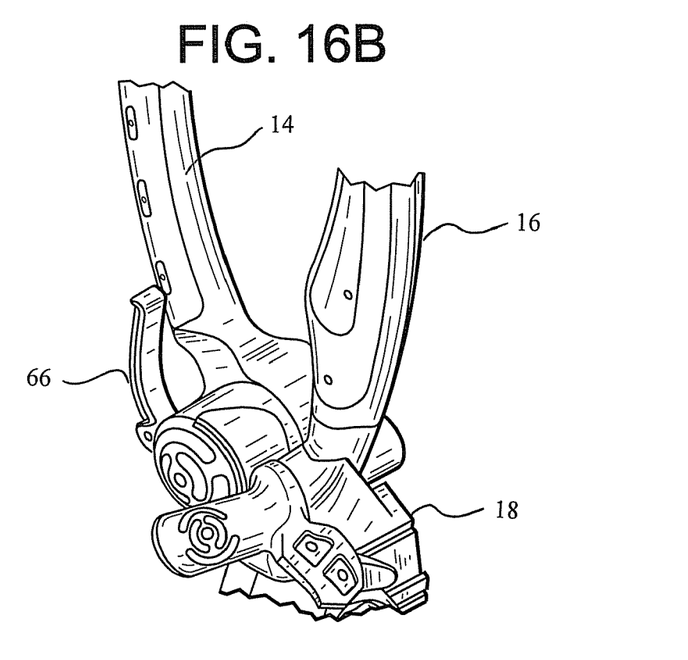

Turning to FIGS. 15 and 16A-B, in one embodiment, the hinge joint between base 12 and arm segment 16 includes a locking assembly which provides an integrated arm restraint mechanism. As shown in FIG. 15, this locking assembly includes a flip lever 66 which attaches to a worm gear 68 and which is mounted in the first elbow 52. It will be appreciated that extending out of elbow 52 is a bearing/encoder cartridge 70 of the type described in the '496 patent. A bushing 72 is received in an opening 74 in elbow 52. The bushing 72 is positioned within opening 74, worm gear 68 is within bushing 72 and flip lever 66 is positioned on worm gear 68 with the entire assembly being connected together using an appropriate threaded fastener 76 and 78. As shown in FIGS. 16A and 16B, when activated, the arm restraint mechanism will prevent arm segment 14 from moving and/or falling down and damaging the arm. In the embodiment shown, when the lever is forced downwardly, this is an unlock position, while when the lever is positioned upwardly, it is a locked position.

Figure 17:
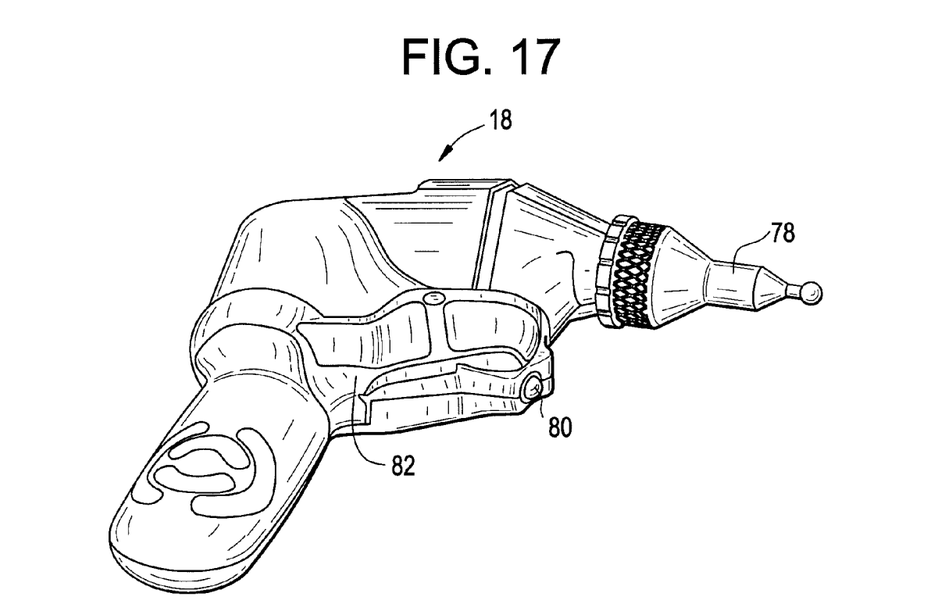
FIG. 17 is a perspective view of a measurement probe with an integrated track ball.
Figure 18:
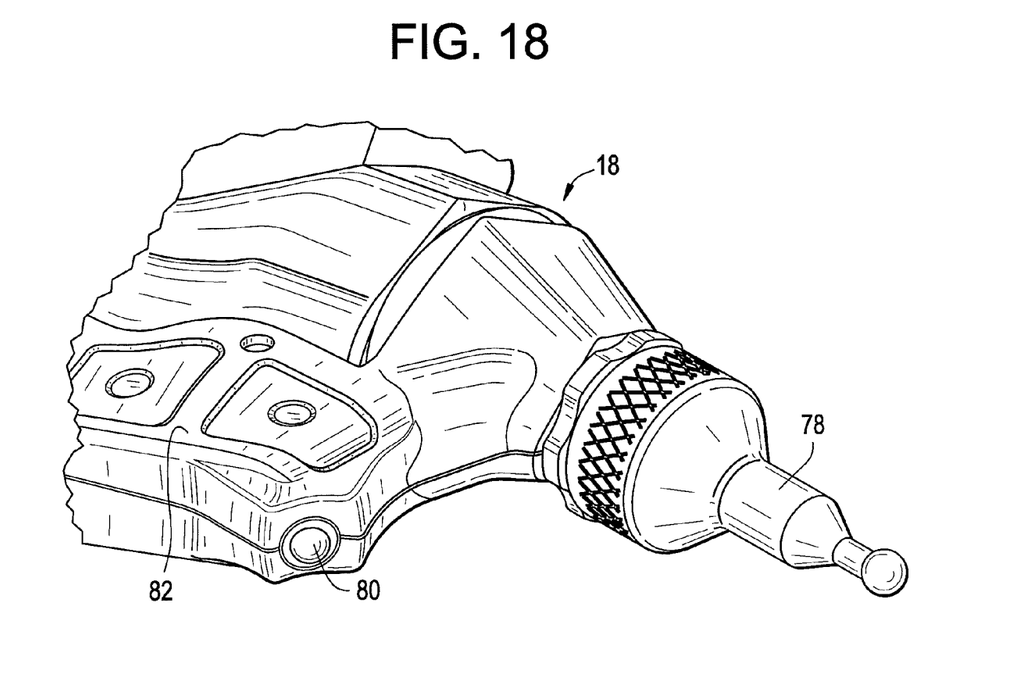
FIG. 18 is an enlarged perspective view of the measurement probe of FIG. 17.

As shown in FIGS. 17 and 18, the measurement probe 18 preferably has a pistol grip configuration and includes a conventional measurement probe end 78. Also preferably, measurement probe 18 includes an integrated track ball 80 for use in field and object selection required by the operating software. The track ball 80 is integrated into the handle 82 of measurement probe 18.

Track ball 80, when rolled, simulates mouse operation. For example, in at least one embodiment, when an operator rolls the trackball, a cursor or mouse pointer on the screen of the host computer will move. Additionally, track ball 80 is structured so that an operator can depress track ball 80. Depressing track ball 80 can actuate a switch inside the housing of the track ball. Track ball 80 can be configured such that depressing or clicking the track ball simulates the clicking of a mouse button.

Track ball 80 allows the human operator of the CMM to manipulate the measurement software without physically returning to the host computer normally used in association with the portable CMM. Thus, faster and more efficient measurements can be made.

Additionally, track ball 80 may be formed of a translucent material, and may also be illuminated such as by using an LED. Thus, track ball 80 can also act as an LED indicator. Multiple LEDs and different color LEDs can be used to increase the indicator capabilities of track ball 80.

While preferred embodiments have been shown and described, various modifications and substitutions may be made thereto without departing from the spirit and scope of the invention. Accordingly, it is to be understood that the present invention has been described by way of illustrations and not limitation.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A portable coordinate measurement machine (CMM) for measuring the position of an object in a selected volume, comprising:
    a manually positionable articulated arm having opposed first and second ends, said arm including a plurality of jointed arm segments, each arm segment including at least one position transducer for producing a position signal;
    a measurement probe attached to said first end of said articulated arm;
    an electronic circuit which receives the position signals from the transducers and provides a digital coordinate corresponding to the position of the probe in a selected volume;
    wherein at least one of said arm segments is non-linear along its length.

2. The CMM of claim 1 wherein:
   said arm segment is curved along its length.

3. The CMM of claim 1 wherein:
   said arm segment is arcuate along its length.

4. The CMM of claim 1 wherein:
   said arm segment has at least two sections along its length with an included angle between said sections of other than 180 degrees.

5. The CMM of claim 1 wherein:
   said arm segment has reverse curves along its length.

6. The CMM of claim 1 wherein:
   said arm segment has a non-circular cross-section.

7. The CMM of claim 6 wherein said cross-section has an aspheric shape.

8. The CMM of claim 6 wherein said cross-section comprises an I-beam.

9. The CMM of claim 6 wherein said cross-section is rectangular, square or triangular.

10. The CMM of claim 1 wherein:
    said arm segment includes an integrated elbow segment.

11. The CMM of claim 1 wherein:
    said arm segment comprises molded material.

12. The CMM of claim 11 wherein:
    said arm segment is molded from a carbon composite molding material.

13. The CMM of claim 1, wherein the measurement probe comprises:
    a probe body;
    a probe end connected to the probe body and structured to touch the position of the object;
    a computer input device integrated into the probe body, wherein the computer input device is structured to communicate with a computer.

14. The CMM of claim 13, wherein the computer input device is a rollable trackball.

15. The CMM of claim 14, wherein the measurement probe is structured so that rolling the trackball causes a cursor or mouse pointer to move on a screen of the computer.

16. The CMM of claim 14, wherein the measurement probe is structured so that the trackball can be depressed and depressing the trackball simulates clicking a mouse button on the computer.

17. The CMM of claim 14, wherein the trackball is formed of translucent material, and the trackball further comprises at least one light source.

18. The CMM of claim 13, wherein the probe body comprises a handle, and the computer input device is integrated into the handle.

19. The CMM of claim 1, wherein at least one of the arm segments is approximately oval-shaped.

20. The CMM of claim 1, wherein at least one of the arm segments comprises removable covers structured to allow access to internal components of the arm segment.

* * * * *